United States Patent [19]

Sakai

[11] Patent Number: 5,072,657
[45] Date of Patent: Dec. 17, 1991

[54] BLOWING LOUVER WITH SWINGING FINS FOR AIR CONDITIONERS

[75] Inventor: Toshifumi Sakai, Hiroshima, Japan
[73] Assignee: Daikyo Co., Ltd., Hiroshima, Japan
[21] Appl. No.: 485,316
[22] Filed: Feb. 28, 1990

[30] Foreign Application Priority Data

Feb. 28, 1989 [JP] Japan .................................. 1-47105
Feb. 28, 1989 [JP] Japan .................................. 1-47106
Jul. 12, 1989 [JP] Japan .............................. 1-82432[U]

[51] Int. Cl.⁵ ........................................... F24F 13/15
[52] U.S. Cl. ................................... 454/153; 454/285; 454/313
[58] Field of Search ............... 98/2, 40.3, 94.2, 121.2

[56] References Cited

U.S. PATENT DOCUMENTS 3,577,905  5/1971  Nussdorfer ........................... 98/40.3
4,676,146  6/1987  Takahashi et al. .................... 98/40.3

FOREIGN PATENT DOCUMENTS 58-4256  1/1983  Japan .

*Primary Examiner*—Harold Joyce
*Attorney, Agent, or Firm*—Wegner, Cantor, Mueller & Player

[57] ABSTRACT

Blowing louver for air conditioners provides plural swinging fins for shifting the direction of the wind conditioned. Each fin has first and second swinging axes which are pivotably supported by first and second link members. The first link member is manually operated so as to swing fins about respective second axes and the second link member is driven reciprocally by a driving mechanism so as to swing fins about respective first axes automatically.

8 Claims, 11 Drawing Sheets

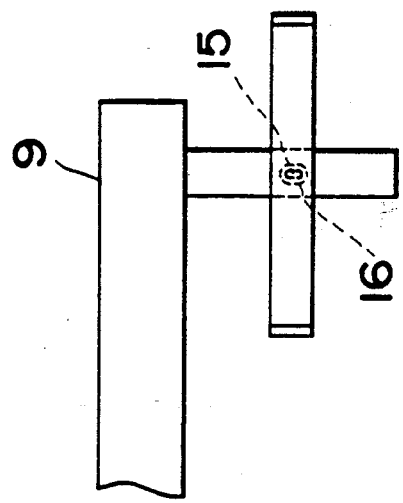
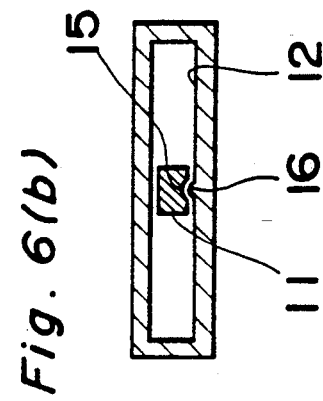
Fig. 6(a)  Fig. 6(b)
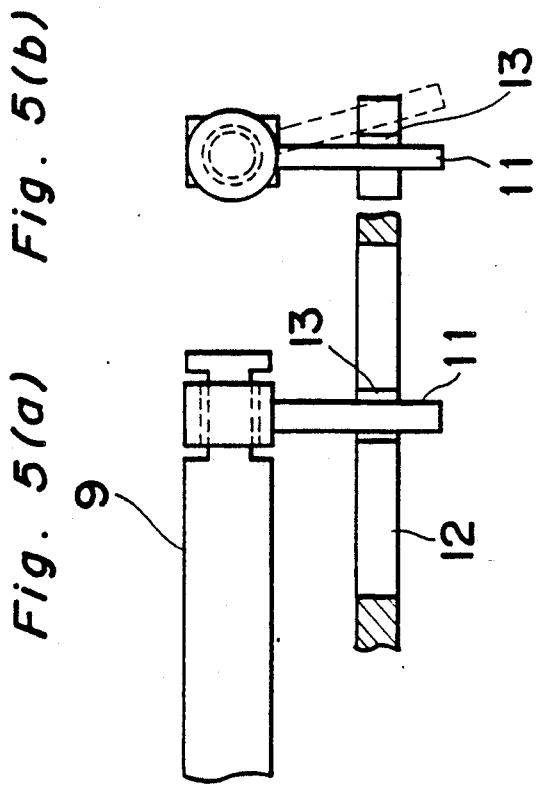
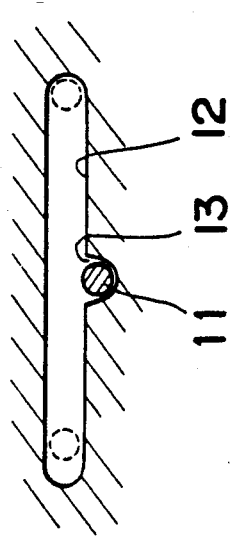
Fig. 5(a)  Fig. 5(b)
Fig. 5(c)

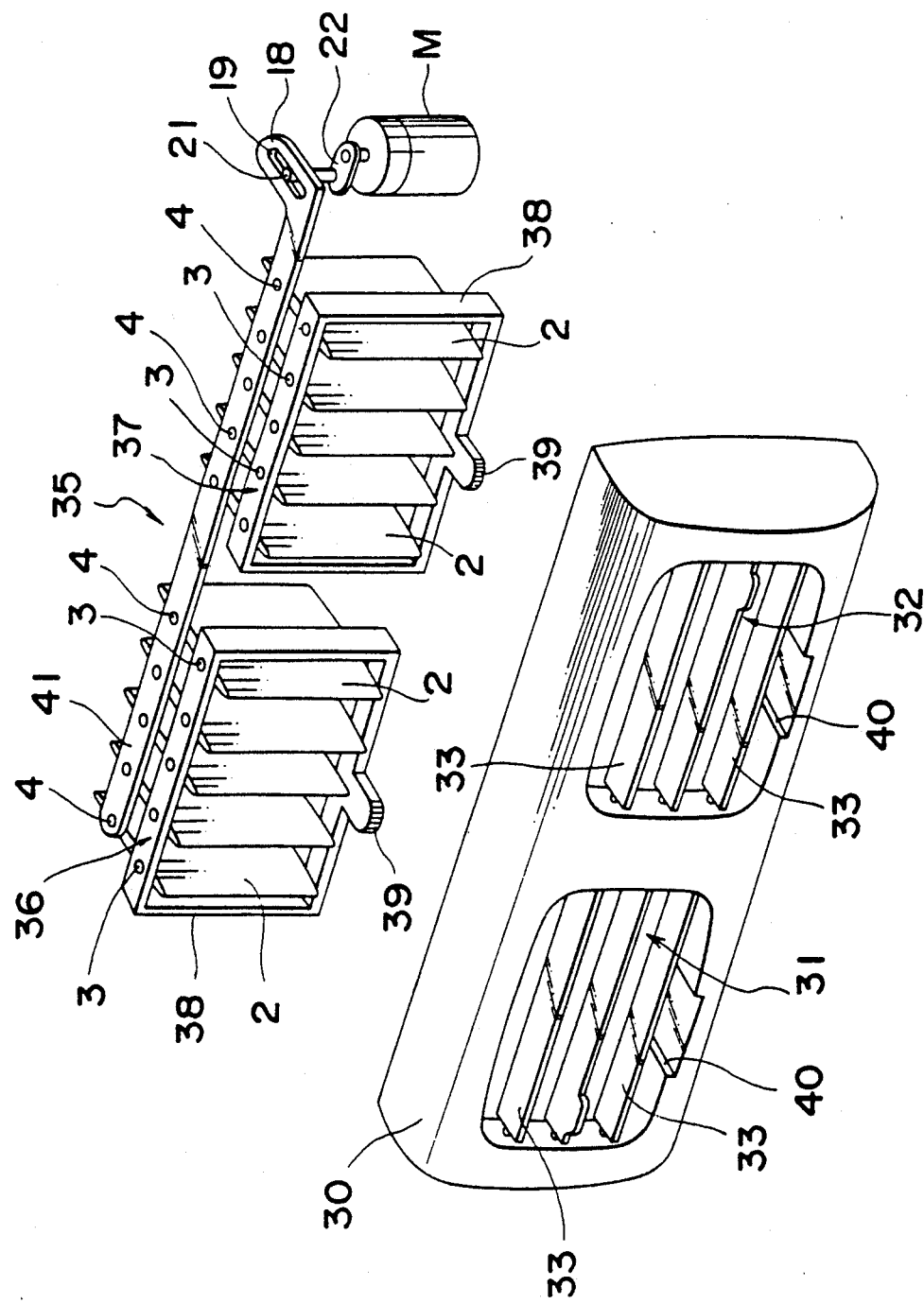

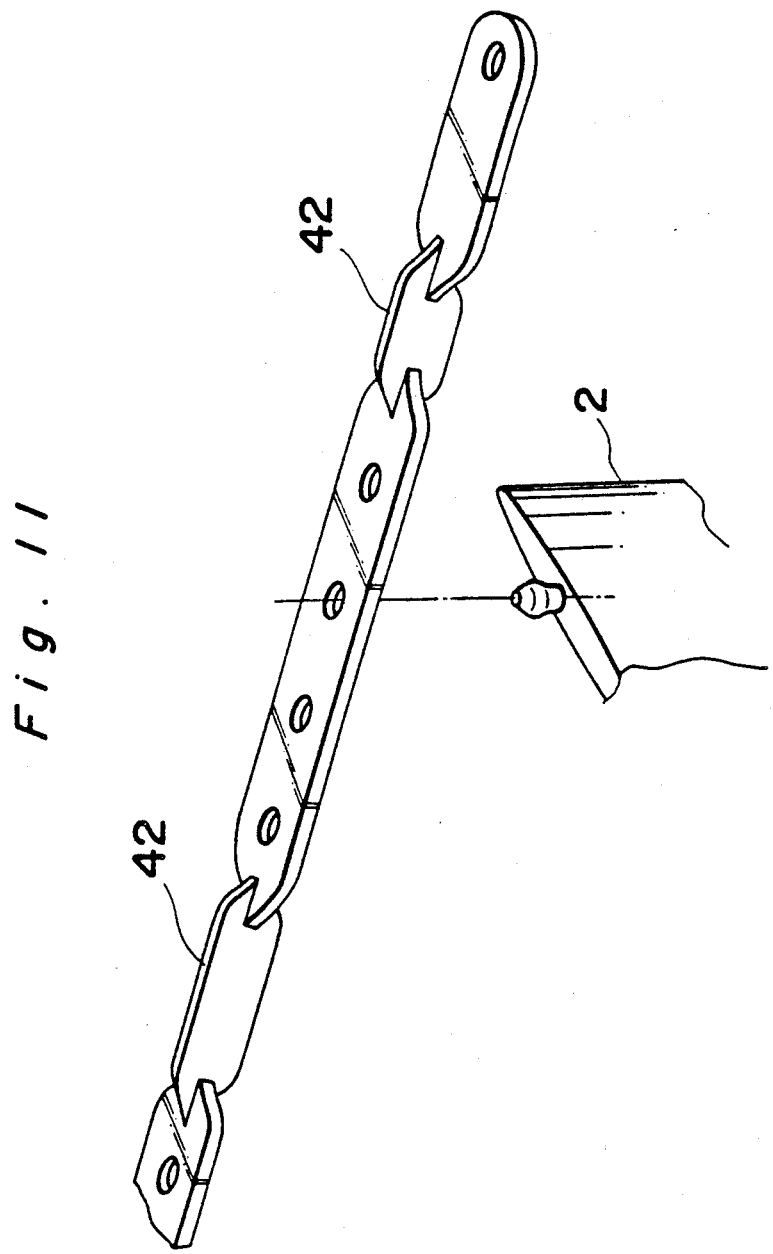

5,072,657

BLOWING LOUVER WITH SWINGING FINS FOR AIR CONDITIONERS

BACKGROUND OF THE INVENTION

1. Field of the Invention

The present invention relates to a blowing louver for an air conditioner which provides swinging fins for shifting the direction of the air to be blown out, and more particularly to a swinging mechanism for the fins.

2. Related Art

Conventionally, there has been proposed a blowing louver with swinging fins for an air conditioner such as a car air cooler in which the fins are automatically driven so as to swing within a predetermined angle repeatedly around respective pivotal axes when a driving motor is switched on and, when the driving motor is switched off, they are manually operable to shift the direction of the wind (See for example Japanese patent publication S58-4256). In such a blowing louver as mentioned above, there is provided a clutch mechanism for releasing an engagement between a driving force transmission mechanism and the fins to be driven thereby order to bring them to a manually operable state.

In the above patent publication, there is disclosed a slider mechanism utilizing the friction contact or an over-running clutch mechanism such as a ratchet and wheel mechanism. In the former mechanism, the switching operation of the clutch is done manually and, in the latter mechanism, it is done automatically. The former mechanism is disadvantageous in that the manual switching operation is often forgotten since it is laborious. Contrary to this, the latter mechanism is advantageous since the switching is automatically done. However, the latter has such a disadvantage that the engaging force at the engaging part becomes weak, resulting in a hindrance to the swinging of the fins when used repeatedly, since it is necessary to move the connecting part against the engaging force between the transmission mechanism of the driving force upon manual operation of the fins.

SUMMARY OF THE INVENTION

An essential object of the present invention is to provide a blowing louver with swinging fins for air conditioners which is able to switch from the automatic swinging to the manual swinging or vice versa without using any clutch mechanism as mentioned above.

Another object of the present invention is to provide a blowing louver with swinging fins for air conditioners which is able to set a desirable direction of the fins upon stopping the automatic swinging drive.

In order to accomplish these objects, according to the present invention, there is provided a blowing louver for air conditioners comprising plural fins for shifting the direction of the wind each of which provides first and second parallel, at least one first link member for connecting said first pivotal axes of a predetermined number of said fins in common, at least one operation means for moving said at least one first link member manually in a length-wise direction thereof, at least one second link member for connecting said second pivotal axe of a predetermined number of said fins in common, and at least one driving means for driving said at least one second link member reciprocally in a length-wise direction thereof.

BRIEF DESCRIPTION OF THE DRAWINGS

These and other objects and features of the present invention will become clear from the following description taken in conjunction with the preferred embodiment thereof with reference to the accompanying drawings, in which:

FIG. 5(a), 5(b) and 5(c) are views for showing a locking mechanism of a manual operation lever, FIGS. 6(a) and 6(b) are views for showing another example of the locking mechanism of the manual operation lever, FIG. 10 is a perspective view of a blowing louver according to another preferred embodiment of the present invention, FIG. 11 is a perspective view of a second link member for connecting second swinging fins.

DETAILED DESCRIPTION OF THE PREFERRED EMBODIMENT

Figure 1:
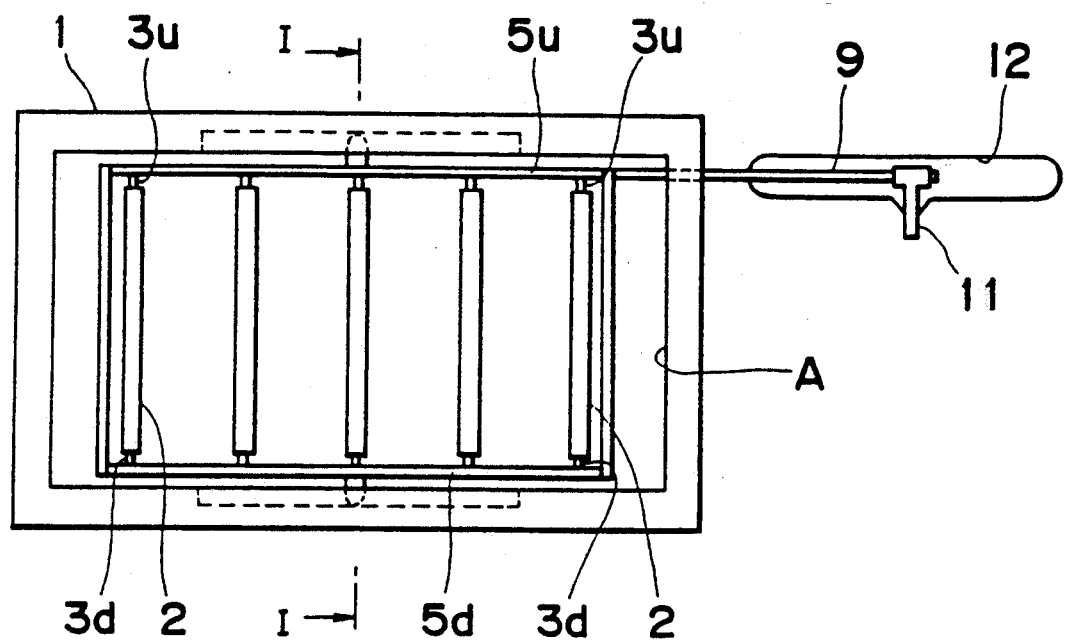
FIG. 1 is a front view of a blowing louver according to the preferred embodiment of the present invention.
Figure 2:
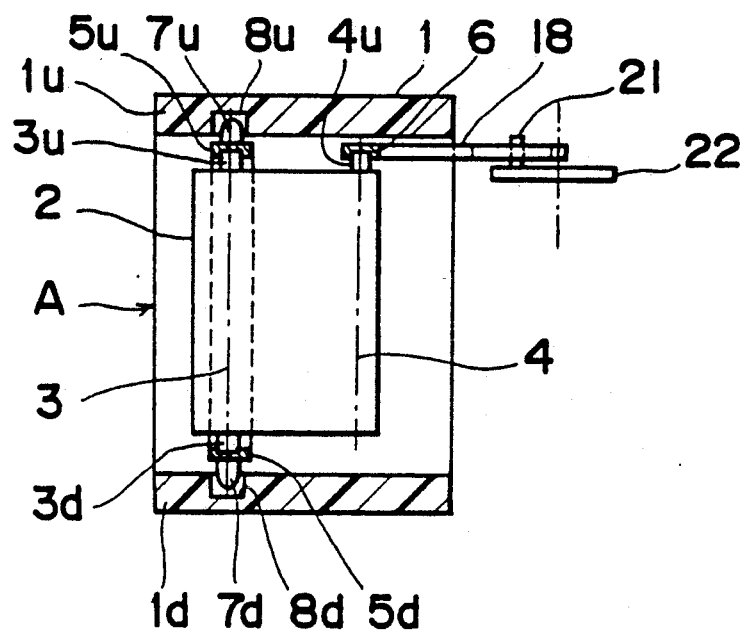
FIG. 2 is a cross-sectional view along a line I—I of FIG. 1.
Figure 3:
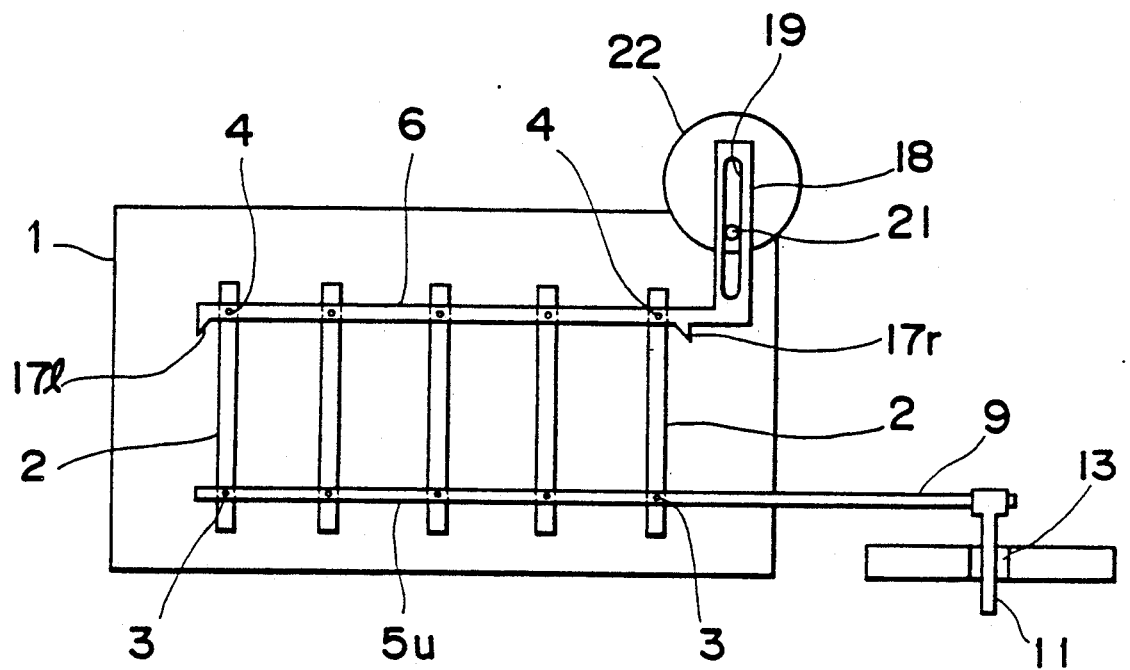
FIG. 3 is a schematic plan view of the blowing louver according to the preferred embodiment of the present invention.

FIG. 1 is a schematic front view of a blowing louver with fins according to the preferred embodiment of the present invention, FIG. 2 is a cross-sectional view along I—I line of FIG. 1 and FIG. 3 is a schematic plan view thereof.

In these figures, plural fins 2 for shifting the direction of the air to be blown out are arranged apart from each other by a predetermined distance in a space defined by a louver frame 1 forming a rectangular blowing aperture A.

As shown in FIGS. 2 and 3 clearly, each fin 2 provides first and second swinging axes 3 and 4 in a vertical direction thereof. The first swinging axis 3 is defined by upper and lower pivotal projections 3u and 3d formed upwardly and downwardly on the front side of upper and lower end faces of the fin 2, and the second swinging axis 4 is defined by an upper pivotal projection 4u. These fins 2 are connected in common with upper and lower first link members 5u and 5d which extend in a horizontal direction in parallel with each other along the upper and lower flame portions 1u and 1d of the louver flame 1. The upper and lower pivotal projections 3u and 3d of the fin 2 are pivotably supported by the upper and lower first link members 3u and 3d so that each fin 2 can swing around the first swinging axis 3.

The upper pivotal projections 4u of the fins 2 forming the second swinging axe 4 are also connected in common by an upper second link member 6 extending in parallel with the upper first link member 5u and the upper flame portion 1u of the louver flame 1 so that each fin 2 can swing around the second swinging axis 4.

The upper and lower first link members 5u and 5d have upward and downward projections 7u and 7d, respectively, which fit into upper and lower guide grooves 8u and 8d formed on the upper and lower frame portions 1u and 1d. The upper and lower guide grooves 8u and 8d are formed in parallel with the upper and lower first link members 5u and 5d so as to guide them while keeping the parallel relation between them when the upper first link member 5u is operated.

The upper first link member 5u has an end 9 elongated in a length-wise direction thereof and a manual operation lever 11 is mounted on the elongated end 9. This elongated end 9 extends till an aperture 12 formed on an operation panel of the air conditioner and the manual operation level 11 projects from the aperture 12 (See FIG. 1) so as to be able to operate it manually.

Thus, the upper and lower first link members 5u and 5d, the elongated end 9 and the manual operation lever 11 constitute a manual operating mechanism for the fins 2. Namely, when an operator operates the manual operation lever 11 in a direction for example in a left direction, as shown in FIG. 4, the upper and lower first link members 5u and 5d are moved in the direction while being guided by the guide grooves 8u and 8d and, thereby, all fins 2 are swung around individual second swinging axe 4 by an angle corresponding to the amount of movement of the lever 11.

It is desirable to mount the manual operation lever 11 rotatably around the elongated end 9, as shown in FIGS. 5(a), 5(b) and 5(c). In this case, the lever 11 is automatically engaged to a notch 13 formed at the center of lower edge of the aperture 12 by the dead weight thereof when the upper first link member 5u is moved without operating the lever 11. In other words, the operation lever 11 is automatically held in the notch 13 during the automatic swinging.

Alternatively, as shown in FIGS. 6(a) and 6(b), it is also possible to form a small concavity 15 on the lower face of the operation lever 11 and a small projection 16 on the center of the aperture 12 so as to engage with each other when the operation lever 11 comes to the center position of the aperture 12.

Figure 4:
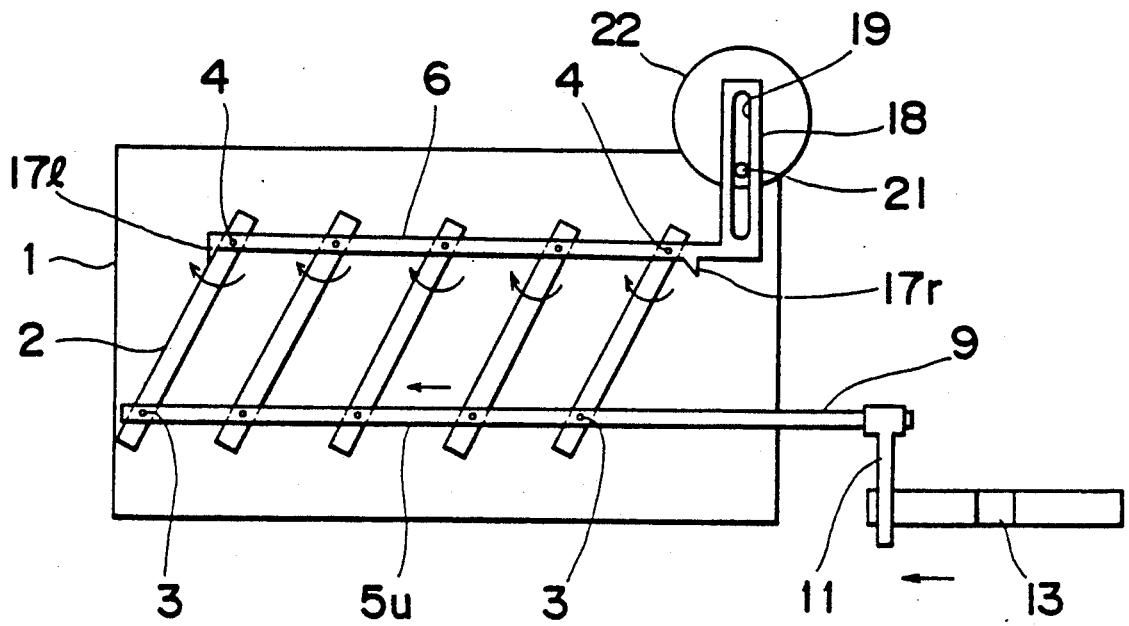
FIG. 4 is a schematic plan view of the blowing louver for showing swinging fins.

As shown in FIGS. 3 and 4, the upper link member 5 provides triangular stoppers 17l and 17r at both end portions thereof. These stoppers 17l and 17r determine left and right swing limits of the fins 2.

On the other hand, the second link member 6 has an arm 18 extending rearwardly from an end thereof. On the arm 18, there is formed an elongated groove 19 extending in the length-wise direction thereof into which a crank pin 21 is sliderablly engaged. The crank pin 21 is fixed on a crank disk 22 which is driven to rotate about its center by a motor (not shown). Namely, the arm 18, crank pin 21 and crank disk 22 form a crank mechanism for swinging the fins 2 reciprocally by rotating the crank disk 22. In this automatic swinging mode, all fins 2 are swung around respective first swinging axes 3 according to the reciprocal movement of the second link member 6 and, thereby, the direction of the air is automatically shifted.

In the structure mentioned above, when the motor is switched off in the automatic swinging mode, the fins 2 take an arbitrary swing angle corresponding to the stop timing of the motor. Accordingly, it becomes necessary to operate the fins 2 manually in order to obtain a desirable direction of the air. Further, if the motor is switched on when the manual operation lever 11 location is shifted from the center position (the notch 13), the fins 2 are moved parallelly without swinging at first since the upper and lower first link members 5u and 5d are moved together with the second link member 6 until the manual operation lever 11 is caught by the notch 13.

In order to avoid these inconveniences mentioned above, it is desirable to control the motor so as to stop at a predetermined phase.

Figure 7:
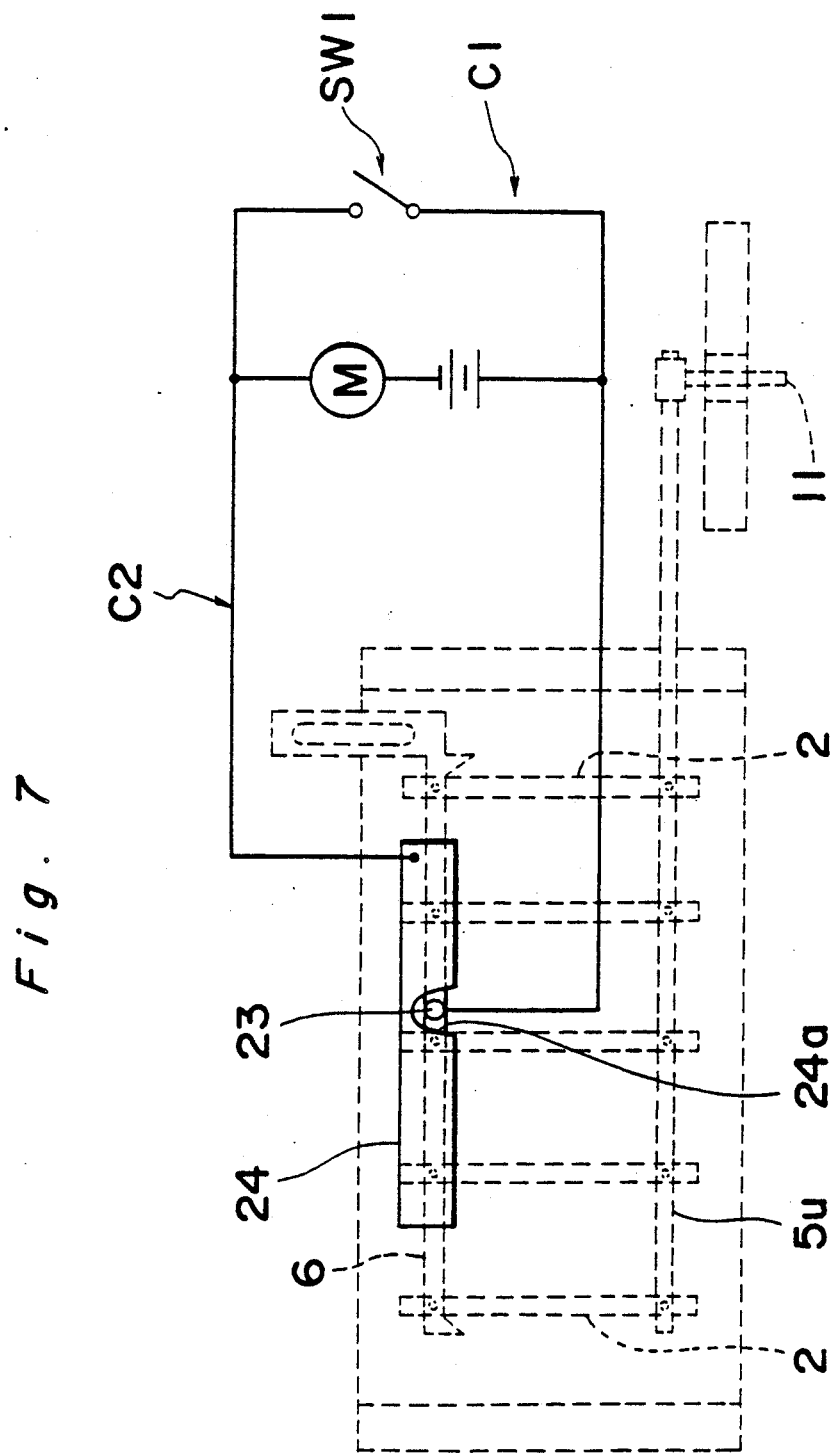
FIG. 7 shows a control circuit of a motor for swinging fins.

FIG. 7 shows a control circuit for the motor.

The control circuit has a first control circuit C1 including a manual switch SW1 and a second control circuit C2 for controlling the motor M so as to stop at a predetermined phase. The second control circuit C2 includes a switching mechanism comprised of a movable contact 23 formed on the second link member 6 and a stationary contact plate 24 fixed on the inner surface of the upper frame portion 1u of the louver frame 1 which extends in parallel with the second link member 6. The contact plate 24 has a notched portion 24a at a predetermined position thereof. When the movable contact 24 comes to the position of the notched portion 24a of the contact plate 24, the motor M is switched off as far as the second control circuit C2 concerns.

Since the first control circuit C1 is provided in parallel with the second control circuit C2, the motor M is driven irrespective to the second control circuit C2 being switched on and off insofar as the manual switch SW1 of the first control circuit C1 is switched on. Accordingly, the fins 2 are swung automatically.

On the other hand, the motor M is not stopped at once even when the manual switch SW1 is switched off. In other words, the motor M continues to rotate until the movable contact 23 comes to the notched portion 24a of the contact plate 24. Therefore, the motor M is always stopped at a predetermined phase. The position of the notched portion 24a is usually selected so as to orient the fins 2 in a direction perpendicular to the aperture A of the louver frame 1.

Thus, according to the control circuit mentioned above, the fins 2 are always stopped in a desirable direction, as shown in FIG. 7. Accordingly, it is not always necessary to operate the manual operation lever 11 when the automatic swinging mode is released.

FIGS. 8 and 9 show other examples of the switching mechanism for the second control circuit C2.

Figure 8A:
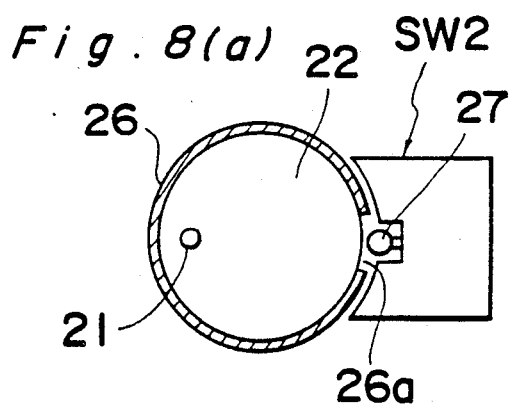
FIGS. 8(a) and 8(b) show another example of the control circuit of the motor for swinging fins.
Figure 8B:
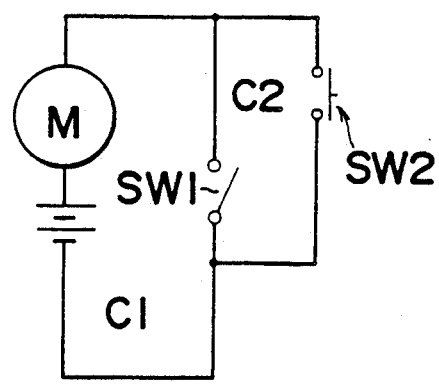

In the example shown in FIGS. 8(a) and 8(b), the switching mechanism SW2 is comprised of a contact ring 26 having a notched portion 26a which is formed along the periphery of the crank disk 22 made of an inslating material and a contact ball 27 biased by a suitable spring (not shown) so as to contact to the contact ring 26. In this case, when the notched portion 26a of the contact ring 26 comes to the position of the contact ball 27 according to the rotation of the crank disk 22, the motor M is switched off at a phase determined by the phase of the notched portion 26a.

Figure 9A:
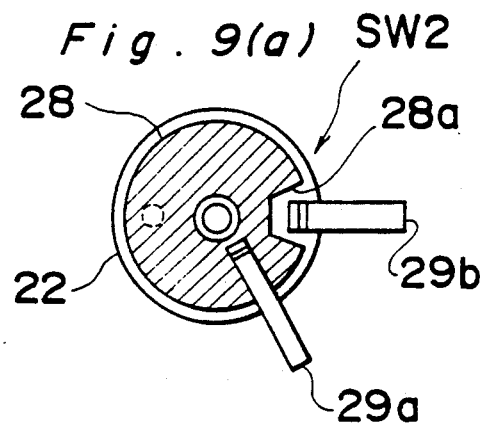
FIGS. 9(a) and 9(b) show one more example of the control circuit of the motor for swinging fins.
Figure 9B:
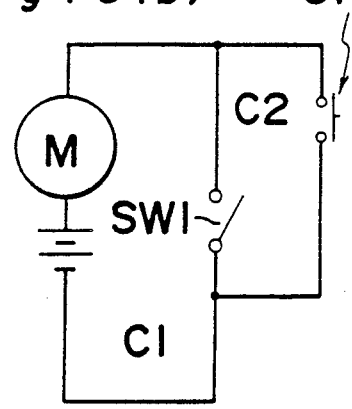

In the example shown in FIGS. 9(a) and 9(b), a circular contact plate 28 having a notched portion 28a is fixed on the under surface of the crank disk 22. To this contact plate 28, two spring contacts 29a and 29b are arranged. The first spring contact 29a is arranged so as to contact to the contact plate 28 always and the second spring contact 29b is arranged on a rotation locus of the notched portion 28a. Accordingly, when the notched portion 28a comes to the position of the second spring contact 29b, the motor M is switched off at a phase determined by the phase of the notched portion 28a. Namely, the contact plate 28 and two spring contacts 29a and 29b constitute the switching mechanism for switching off the motor M at a predetermined phase.

FIG. 10 is a perspective view showing a blowing louver according to the present invention.

This blowing louver is substantially comprised of a louver frame 30 forming two apertures 31 and 32 wherein horizontal fins 33 are arranged pivotably about respective horizontal axe and a fin assembly 35 comprising two units 36 and 37 each of which has five vertical fins 2.

Each unit 36 or 37 has a rectangular frame 38, as the first link member 5, which supports five vertical fins 2 pivotably around respective first swinging axes 3 in common. Each rectangular frame 38 has a nob 39 for manually operating the vertical fins 2 of each unit 36 or 37 which is slidably fitted in a shallow and relatively wide groove 40 formed on the bottom wall of each aperture 31 or 32.

These two units 36 and 37 are connected by a long link member 41, as the second link member 6, which pivotably supports second swinging axes 4 of all vertical fins 2 in common. This second link member 41 has an arm 18 having a groove 19 at one end thereof. Into the groove 19, a crank pin 21 is slidablly engaged and a crank arm 22 supporting the crank pin 22 is driven by a motor M.

Thus, when the motor M is switched on, the second link member 41 is moved in the length-wise direction thereof reciprocally, and, thereby, all vertical fins 2 are reciprocally swung about respective first swinging axes 3, as explained above.

FIG. 11 shows an example of the second link member. In this case, the second link member is made of a flexible material such as resin in the form of a band connected by vertical elements 42. The second link member of this type is advantageous in that every unit of fins can be arranged in a direction slightly different from other units of fins.

Figure 12:
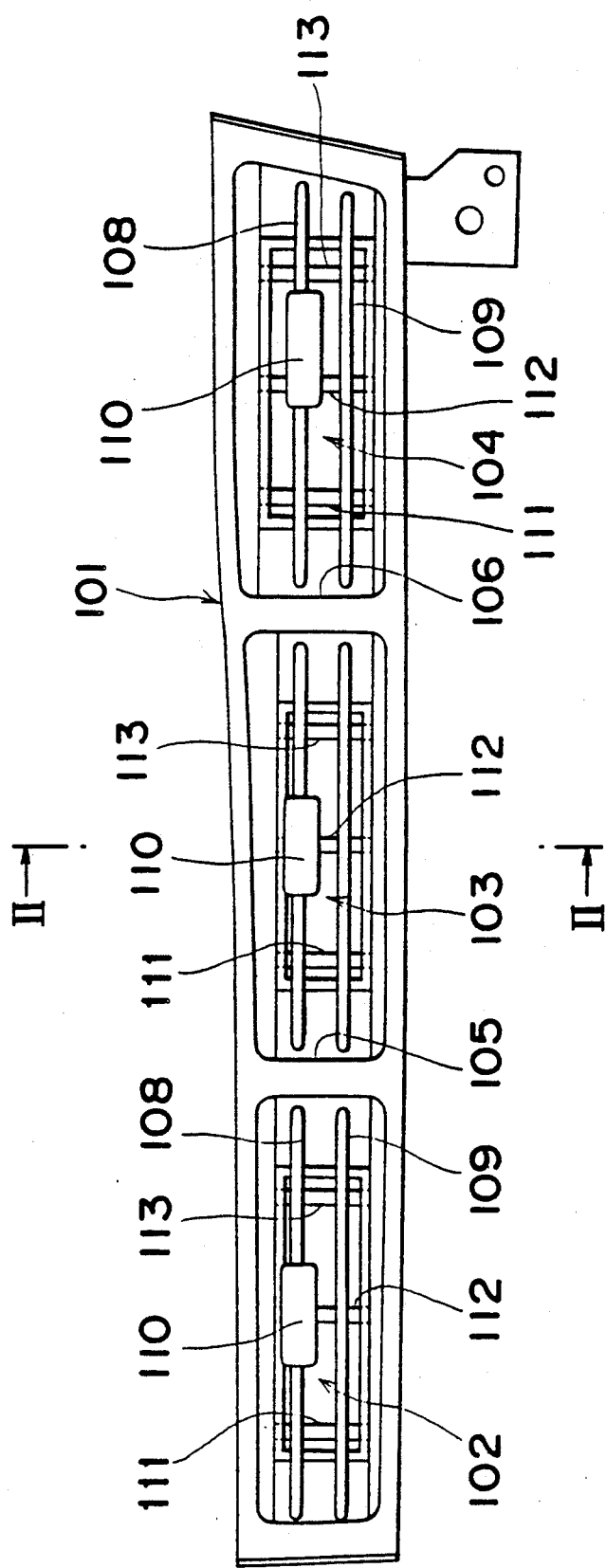
FIG. 12 is a front view of a blowing louver according to one more preferred embodiment of the present invention.
Figure 13:
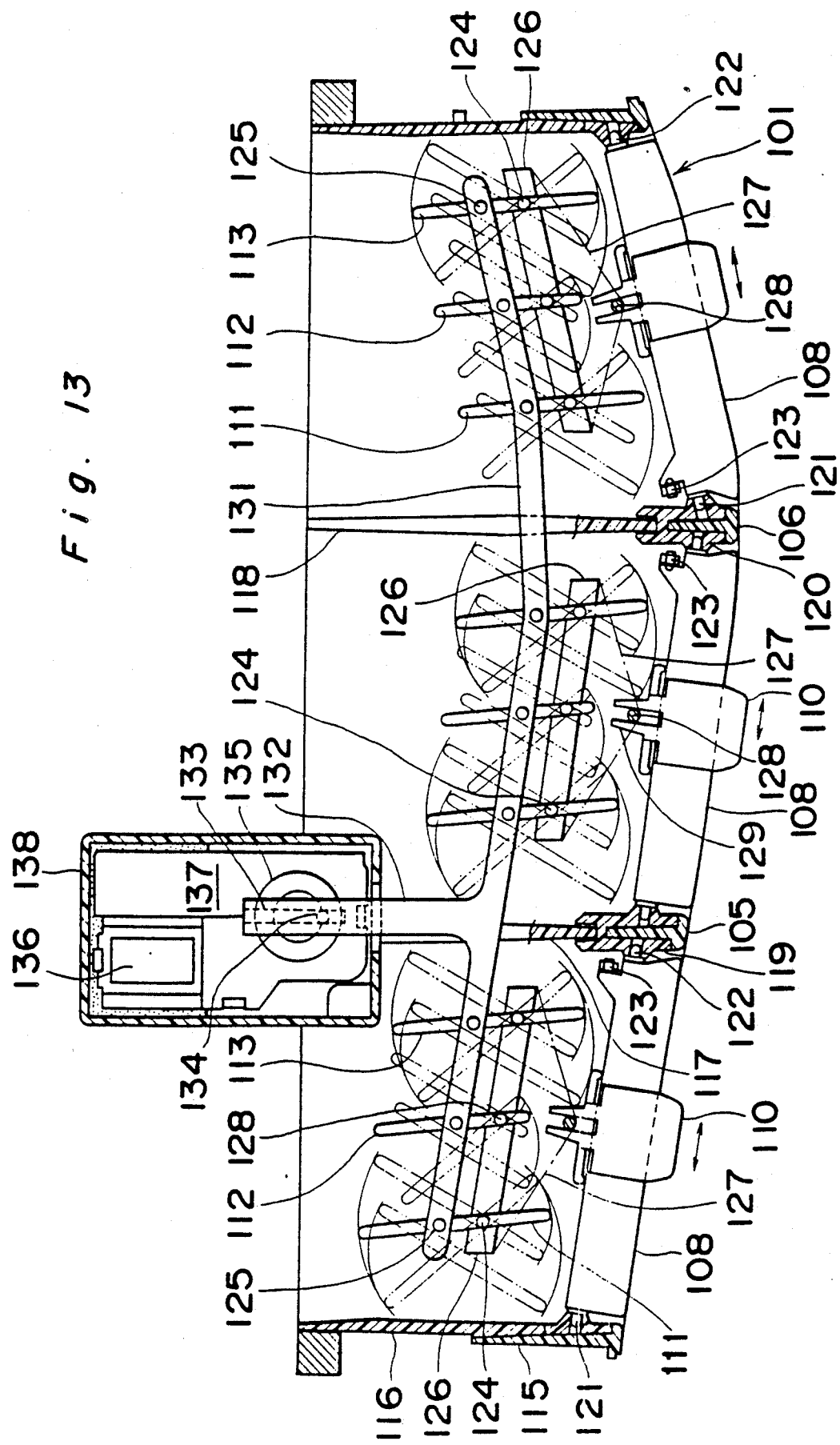
FIG. 13 is a horizontal cross-sectional view of the blowing louver shown in FIG. 12.
Figure 14:
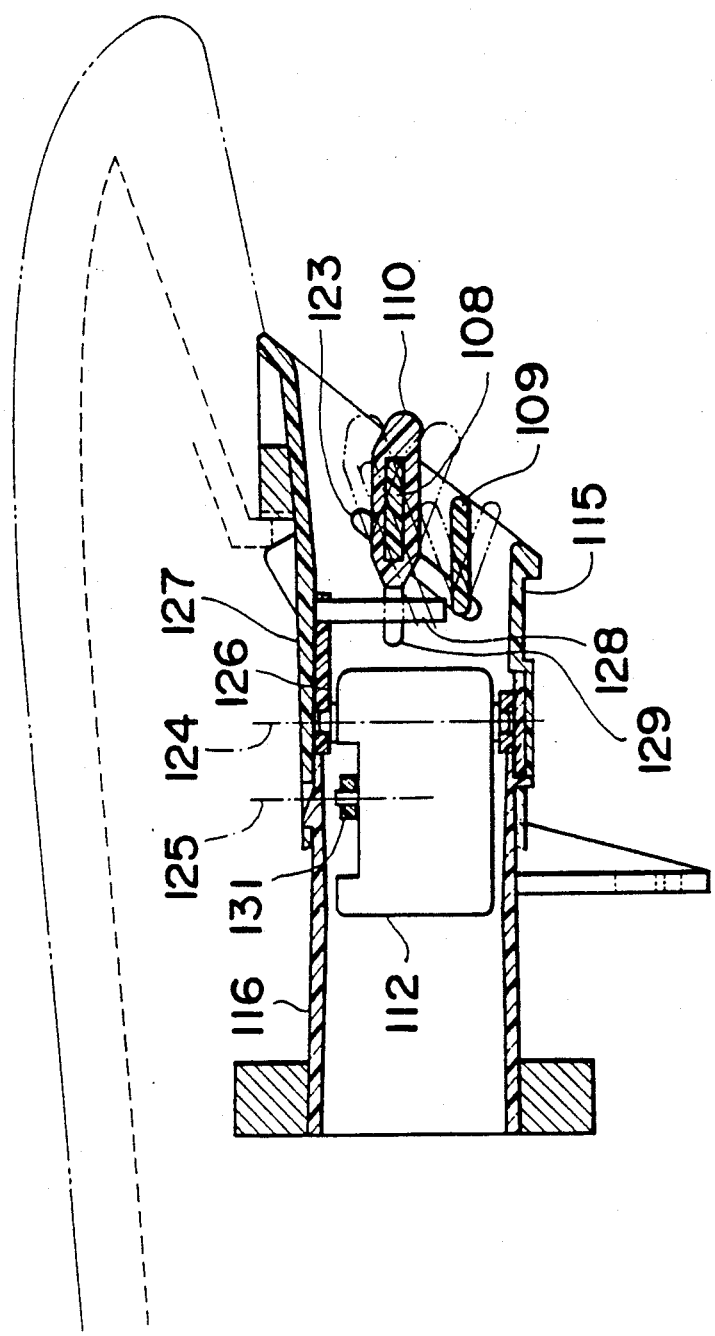
FIG. 14 is a cross-sectional view along a line II—II of FIG. 12.

FIGS. 12, 13 and 14 show another preferred embodiment of the present invention.

As shown in FIG. 12 a blowing louver frame 101 provides three blowing apertures 102, 103 and 104 partitioned by two columns 105 and 106 formed at the front of the blowing louver frame 101.

In each of the blowing apertures 102, 103 and 104, upper and lower horizontal fins 108 and 109 are arranged pivotably around respective horizontal axes as will be explained later in detail. To each upper horizontal fin 108, there is provided an operation nob 110 which is slidable therealong in a horizontal direction. In the back space of each blowing aperture 102, 103 or 104, there are arranged three vertical fins 111, 112 and 113.

As shown in FIGS. 13 and 14, the louver frame 101 is comprised of a front housing 115 and a rear housing 116 which is inserted into the front housing 115 from the rear side. Between each of the columns 105 and 106 of the front housing 115 and each of vertical ribs 117 and 118, connecting columns 119 and 120 for pivotably supporting the horizontal fins 108 and 109 are inserted, respectively.

Each of the horizontal fins 108 and 109 has pivotal projections 121 and 122 projected from respective ends in the length-wise direction thereof. These pivotal projections 121 and 122 are received by the front portion of the rear housing 116 and/or connecting column 119 or 120, respectively and, thereby, each horizontal fin 108 or 109 is supported pivotably about a horizontal axis. Each pair of the upper and lower horizontal fins 108 and 109 are connected by a vertical link 123 so as to pivot together when the operation nob 110 is operated, in a vertical direction, as shown in FIG. 14.

As stated in the foregoing preferred embodiment, each vertical fin 111, 112 or 113 has first and second pivotal axes 124 and 125.

Figure 15:
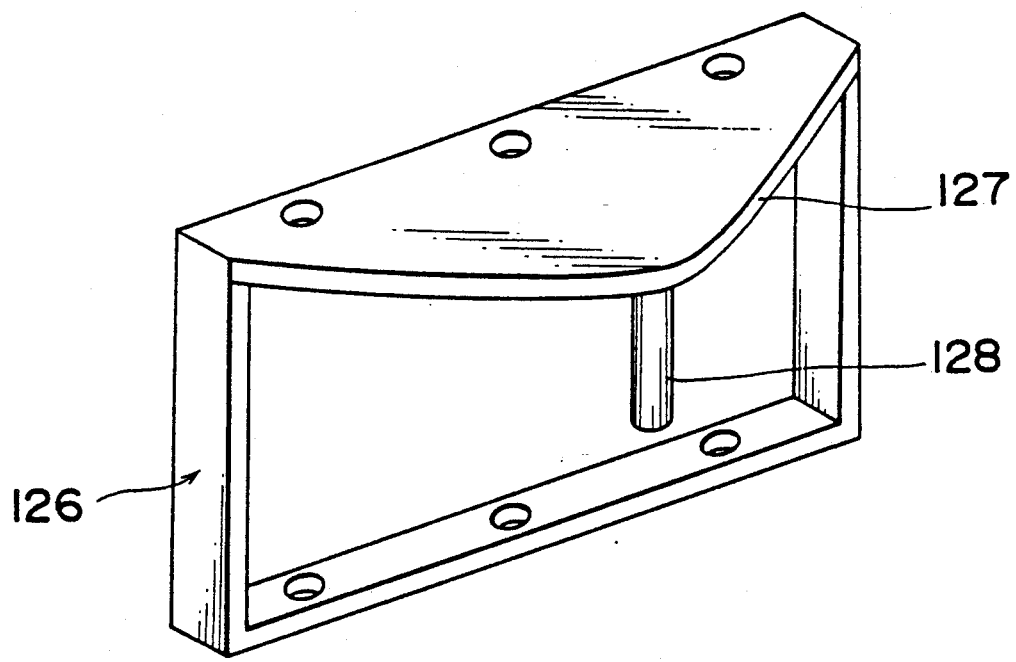
FIG. 15 is a perspective view of a first link member for connecting first swinging axe of vertical fins.

The first axes 124 of every three vertical fins 111, 112 and 113 are supported pivotably by a link member 126 of a rectangular frame shape as shown in FIG. 15. The link member 126 has a triangular overhang 127, at the apex of which a connecting pin 128 is projected downwardly. This connecting pin 128 is engaged with a fork 129 provided at the rear side of each operation nob 110. Accordingly, the direction of each vertical fin 111, 112 or 113 is changed by operating each nob 110 so as to slide along the upper horizontal fin 108, as shown in FIG. 13. Namely, when the nob 110 is slid along the upper horizontal fin 108, the connecting pin 128 is moved together with the link member 126. Thus, three vertical fins 111, 112 and 113 supported by the link member 126 are simultaneously swung around respective second swinging axes 125.

The second swinging axes 125 of all vertical fins are connected in common by a second link member 131 extending transversally in the rear housing 116. The second link member 131 has a trunk portion 132 extending rearwardly which provides a groove 133 into which a crank pin 134 is fitted. The crank pin 134 is supported by a crank disk 135 which is driven by a motor 136 via a gear transmission mechanism 137. The motor 136 and the gear transmission mechanism 137 are housed in a motor housing 138 being formed integrally with the rear housing 116.

Thus, when the motor 136 is switched on, the crank pin 134 is rotated about the center of the crank disk 135 and, thereby, the second link member 131 is moved reciprocally in a transversal direction. Due to this reciprocal movement of the second link member 131, all vertical fins are swung reciprocally about respective first swinging axes 124.

In this preferred embodiment, the horizontal fins and the vertical fins are manually operated by the operation nob 110 in common. And, in the automatic swinging mode, all vertical fins are swung by the second link member 131 in common.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A blowing louver for automotive air conditioners, comprising:
   a louver frame defining at least one blowing aperture;
   a plurality of horizontal fins supported swingably about respective horizontal axes in a front portion of said louver frame;
   a plurality of vertical fins supported rearwardly of said horizontal fins, each of said vertical fins having first and second parallel vertical pivotal axes;
   a first link member for connecting said first vertical pivotal axes of said vertical fins in common, said link member being supported by said louver frame slidably in a direction parallel to the length-wise direction of the louver frame;
   a second link member for connecting said second vertical pivotal axes of the vertical fins in common, said second link member extending substantially parallel to said first link member;
   operation knob means slidably mounted on one of said horizontal fins, operably coupled to said first link member so that when said first link member is moved by operating said operating knob, said vertical fins are swung simultaneously about their respective second vertical axes; and
   driving means for driving said second link member reciprocally over a predetermined stroke so as to make said vertical fins swing reciprocally about their first vertical axes, said driving means being capable of being switched off independently of the air conditioner.

2. A blowing louver as claimed in claim 1, wherein said louver frame defines a plurality of blower apertures in each of which plural horizontal fins are arranged.

3. A blowing louver as claimed in claim 2, in which said plurality of vertical fins are grouped and arranged corresponding to respective blowing apertures of said blowing louver.

4. A blowing louver as claimed in claim 3, in which a first link member is provided for each group of vertical fins, the second vertical pivotal axes of all of the vertical fins being connected by the same second link member.

5. A blowing louver as claimed in claim 4, wherein operation knob means is provided for each group of vertical fins so that the orientation of the groups of vertical fins may be adjusted individually by operating the operation knob means corresponding thereto.

6. A blowing louver as claimed in claim 1, in which said horizontal fins are coupled so as to swing commonly when said operation knob means is operated in a vertical direction.

7. A blowing louver as claimed in claim 1, further comprising a holding means capable of stopping and holding said operation means at a neutral position when the vertical fins are swung reciprocally by said driving means and said second link member.

8. A blowing louver for automotive air conditioners, comprising:
   a plurality of fins for shifting the direction of air, each of which having first and second parallel pivotal axes;
   a first link member for connecting the first pivotal axes of a predetermined number of said fins in common, permitting the fins to be pivoted about the second axes;
   an operation means for moving the first link member manually in a length-wise direction thereof;
   a second link member for connecting the second pivotal axes of a predetermined number of said fins in common, permitting the fins to be pivoted about the first axes; and
   a driving means for driving the second link member reciprocally in a length-wise direction thereof, said driving means being provided with means for stopping the second link member at a predetermined position when said driving means is switched off, the driving means being capable of being switched off independently of the air conditioner.

* * * * *